Dec. 8, 1942.                H. KELLY                2,304,103
                          CONTROL DEVICE
                        Filed July 22, 1939
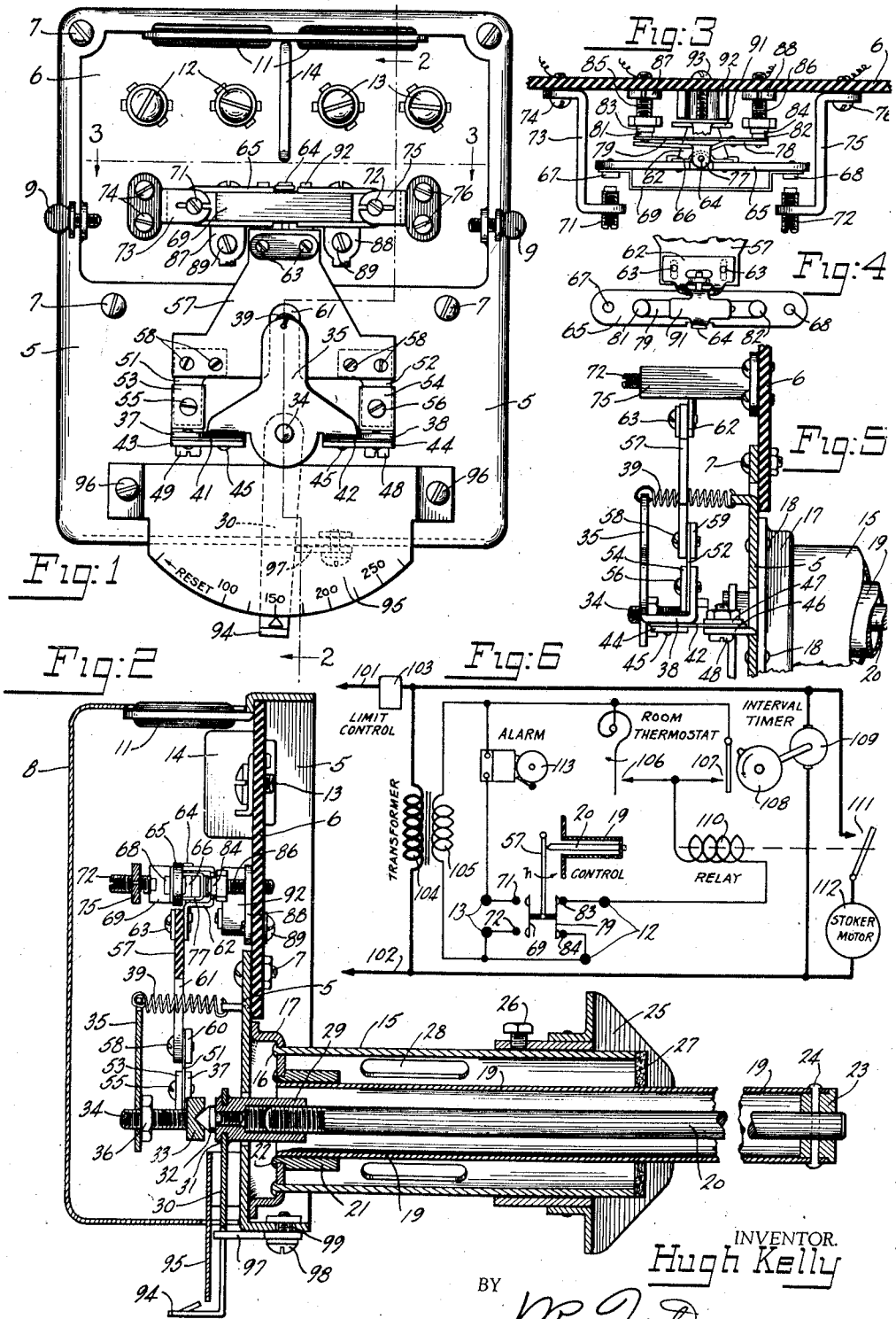
INVENTOR.
Hugh Kelly
BY
ATTORNEY.

Patented Dec. 8, 1942

2,304,103

UNITED STATES PATENT OFFICE 2,304,103

CONTROL DEVICE

Hugh Kelly, Milwaukee, Wis., assignor to Perfex Corporation, Milwaukee, Wis., a corporation of Wisconsin Application July 22, 1939, Serial No. 286,042

25 Claims. (Cl. 200—137)

This invention relates in general to control devices but more particularly to the type of control device wherein circuit or other control means are actuated responsive to changes in the value of a physical condition such as that caused by temperature changes.

An object of the invention is to provide a new and improved control device which is adapted for utilization in controlling the automatic operation of a fuel burning system for a heating plant for example.

In controlling the automatic operation of fuel burning systems it is customary to provide some controlling means such as a limit control whereby the burner motor is shut down in the event that excessive temperatures are produced by the burner. It is also necessary that a combustion responsive control or stack switch be provided to render the system inoperative in case combustion is not established. Frequently forced circulation is provided for the fluid medium such as warm air or hot water, and it is therefore necessary to provide some control means to initiate the circulation of the fluid medium when it is of the proper temperature. In automatic heating systems employing stokers for feeding the fuel to the furnace it is desirable that some control be provided to render the stoker inoperative in case the fire goes out and thereby prevent the continued feeding of green coal into the furnace. Many control devices employed for the aforesaid purposes are provided with thermal elements adapted to be mounted in the bonnet, boiler or stack of a furnace, and changes in temperature conditions produced by the furnace effect the relative expansion or contraction of the thermal elements to perform the desired switching operations.

It is an object of the present invention to provide a control device adapted for use under any of the aforesaid conditions.

A further object is to provide a new and improved control device of simple and durable construction which is extremely sensitive and reliable in operation.

An additional object is to provide new and improved snap action switching mechanism in a control device whereby more accurate and reliable switching operations are performed.

Another object is to provide improved regulating and adjusting means for the switching mechanism of a control device.

A further object of the invention is to provide a control device for a fuel burning system in which means are provided to actuate an alarm signal in the event any abnormal operating condition exists in the system.

With the foregoing objects and features in view and others which will be apparent hereinafter, the invention consists in the construction, arrangement, cooperation and combination of the various elements and parts of the improved control device, whereby the objects contemplated are attained as will be exemplified by the structure to be hereinafter described, disclosed in the drawing, and pointed out in the claims.

A preferred embodiment of the invention is illustrated in the accompanying sheet of drawings in which:

Fig. 1 is a plan view of the control device;

Fig. 2 is a cross sectional side view taken along the line 2—2 of Fig. 1;

Fig. 3 is a top view of the switching mechanism along the line 3—3 of Fig. 1;

Fig. 4 is a fragmentary portion of the switching mechanism on the end of the actuating arm;

Fig. 5 is a side view of a portion of the device of Fig. 1; while,

Fig. 6 is a schematic circuit diagram of a stoker control system incorporating the control device of the invention.

Referring particularly to Figs. 1 and 2, the various elements of the control device are arranged upon a metal supporting base 5 the upper portion of which is cut out to accommodate an insulating mounting panel 6 which is secured to the metal base 5 by a series of screws 7. As shown in Fig. 2 a suitable enclosing cover 8 is provided for the control device which is secured to the base 5 by means of a pair of turn screws 9 (Fig. 1). At the top of the base 5 a turned up projection is provided for accommodating a pair of rubber grommets 11 for the lead-in wires of the control. A pair of motor terminal screws 12 and a pair of alarm terminal screws 13 are arranged upon the front of the panel 6 for the attachment of connecting wires. An insulating barrier 14 on the insulating panel 6 separates the two sets of terminal screws.

Extending rearwardly and perpendicularly from the base 5 at the lower part of the control device is a metal tubular member 15 which is supported by a staking operation at 16 to a supporting collar 17 in turn secured to the rear of the base 5 by a series of rivets 18 (Fig. 5). In this manner the tube is rigidly supported from the rear of the base 5. Within the tubular member 15 there is arranged a physical condition responsive means shown as a pair of thermal responsive members for controlling the mechanism of the control device. This thermal element preferably consists of an elongated relatively expansible tubular member 19 associated with an elongated relatively non-expansible rod 20, the rod and tube having relatively different coefficients of expansion. The expansible tube 19 is secured at one end by means of a collar 21 soldered to the member 19 and staked at 22 to the collar 17 so that a rigid connection or support for the tubular element 19 is provided. At the opposite end of the tubular element 19 a metal plug 23 is inserted which has a hole therein for accommodating the non-expansible rod 20. An anchor pin 24 extends through the tubular element 19, the rod 20, and the plug 23 for rigidly securing the rod and tube together at this end. In order to support the control device in position upon the bonnet, stack or other location of a furnace, a metal flange 25 is provided. This flange has a collar which is slidable to any desired position upon the tubular member 15, and a set screw 26 for locking it in position. In order to prevent the hot furnace gases from entering the inside of the tubular member 15, an asbestos washer 27 is provided to close the end of the tube. A series of ventilating openings 28 are also provided in the tubular member 15 to assist in maintaining the inside of the tube relatively cool so that the operating mechanism will not be affected by thermal conditions existing at the end of the thermal elements.

An adjusting stud 29 is threaded upon the end of the rod 20, and in order to adjust the threaded engagement of the stud with the rod 20, an adjusting arm 30 is provided which is rigidly staked at 31 to the end of the stud 29. The adjusting arm 30 extends downward through the lower edge of the control base 5 to the outside of the cover 8. Threaded in the front end of adjusting stud 29 is a hardened pivoting pin 32 having a pointed end which is arranged to engage a recessed head 33 of a connecting link member and calibrating screw 34. A flat lever or beam 35 formed in the shape shown is threaded upon the end of calibrating screw 34, and a lock nut 36 threaded on screw 34 locks it in its position. The adjusting stud 29, the pivot pin 32, and the link member 34 are all arranged in axial alignment with the rod 20.

The lever or beam 35 is provided at its lower end with a pair of rearwardly and upwardly projecting leg portions 37 and 38 and at its upper end is engaged by a coil spring 39 connected to the base 5 for maintaining it in biased position with respect to the base 5 and so that the calibrating screw 34 is always maintained firmly in engagement with the pivot stud 32. In order to provide a pivoting means for the beam 35 a pair of flat steel spring hinges 41 and 42 are connected to the beam legs 37 and 38. A pair of clamping plates 43 and 44 are secured by rivets 45 to each of the beam legs 37 and 38 to rigidly secure the ends of the spring hinges 41 and 42 to the beam. A pair of lugs 46 (Fig. 5) are punched from the base 5 and serve as a means for supporting the opposite ends of the spring hinges 41 and 42. A pair of hinge clamp plates 47 and bolts 48 and 49 extending therethrough rigidly secure the spring hinges 41 and 42 to the base lugs 46.

With the foregoing arrangement of elements it is seen that the beam 35 is adapted to be rotated about the spring hinges 41 and 42 by direct longitudinal movement of the calibrating screw 34. Referring particularly to Fig. 1 the calibrating screw 34 is positioned slightly above a horizontal line extending between the spring hinges 41 and 42 so that the movement imparted by calibrating screw 34 to the beam 45 is considerably amplified at the end of beam 35, and only a small amount of movement is required to move the beam.

A second pair of steel spring hinges 51 and 52 extending at right angles to hinges 41 and 42 are secured to the beam legs 37 and 38 by means of clamp plate 53 and 54 and clamping screws 55 and 56 respectively. The other ends of the spring hinges 51 and 52 are secured to the projecting legs of an actuating or operating arm 57 preferably made of insulating material. Screws 58 and clamping blades 59 and 60 secure the legs of the actuating arm 57 to the spring hinges. A slot 61 is cut in the actuating arm 57 to permit the spring 39 to pass through it to the base 5. The actuating arm 57 is arranged for pivotal movement subject to the movement of the beam 35, and is arranged to actuate suitable control means shown herein as electrical switching mechanism, although it will be understood that any other control means may be actuated by the arm 57.

Secured to the end of actuating arm 57 is a U-shaped metal bracket 62 fastened thereto by means of a pair of screws 63. A hinge pin 64 extends through both legs of the bracket 62, and, as shown in Fig. 4, is securely clamped by the bracket 62 to the underside of arm 57. The screws 63 pass through slotted openings in the actuating arm 57 in order that they may shift the bracket 62 a limited distance for the purpose of accurately positioning the same upon the end of the arm. The hinge pin 64 pivotally supports an insulating contact bridge arm 65 by means of a strap 66 suitably holding the arm to the pin 64 as seen in Fig. 3. The ends of the insulating contact bridge arm 65 carry movable control elements in the form of a pair of alarm contacts 67 and 68 which are electrically connected together by a bus-bar 69. Disposed in operative relation to the alarm contacts 67 and 68 is a pair of adjustable stationary control elements shown as contact studs 71 and 72. Contact stud 71 threadedly engages the split end of a supporting bracket 73 secured to the insulating panel 6 by screws 74. Contact stud 72 is supported in a similar manner upon bracket 75 which is in turn secured by screws 76 to the panel 6. These contact studs 71 and 72 are each electrically connected through brackets 73 and 75 and screws 74 and 76 respectively to the external connecting terminals 13.

Pivotally supported by a pair of turned up ears 77 to the pivot 64 is a rigid contact arm or bar 78. A flexible contact blade 79 is arranged parallel to the rigid bar 78 and riveted at one end thereto as shown in Fig. 3. Rigid bar 78 is slightly offset so as to provide a slight separation at one end from the flexible blade 79. A pair of movable control elements or contacts 81 and 82 are supported from the ends of the flexible blade 79, the contact 82 being in addition riveted to the rigid bar 78. The movable contacts 81 and 82 are normally engaged with a set of control elements such as fixed contacts 83 and 84 which are supported upon contact studs 85 and 86 threaded into split portions of contact plates 87 and 88 respectively. Contact plates 87 and 88 are in turn fastened to the insulating panel 6 by screws 89. These contacts 83 and 84 are electrically connected through studs 85 and 86 to the external connecting terminals 12. A magnetic armature 91 is formed integral with the U-shaped bracket 62 and is positioned opposite the pole faces of a horseshoe permanent magnet 92. Magnet 92 is supported from the insulating base 6 by a clamping bracket and screw 93. The contact studs 85 and 86 are provided with headed portions adjacent the contact points 83 and 84 whereby the studs may be adjusted by means of a wrench to vary the gap between the armature and magnet 92 when the contacts are closed to vary the operating differential of the control device.

The adjusting arm 30 is provided at its lower end with a turned up portion 94 whereby the arm may be turned and which serves as an indicator for an indicating plate 95. The indicator plate 95 is supported on the base 5 by screws 96 and carries temperature indications along its edge as shown in Fig. 1 for cooperating with indicator 94 in indicating the setting of the control as will be pointed out. An adjustable stop 97 is provided for limiting the range of adjustment of the adjusting arm 30. The stop 97 is adjustable along the bottom edge of the base 5 by means of a clamping screw 98 which is slidably adapted to be positioned in a slot 99 in the base when loosened. The purpose of this stop is to limit the maximum temperature setting of the control.

In the normal position of the control device the motor contacts 81—83 and 82—84 are normally closed while the alarm contacts 67—71 and 68—72 are open. Assume now that the control device is mounted on the furnace of a heating plant so that the right hand end of the thermal element (Fig. 2) projects into a stack or boiler where it is desired to effect a control of the burner thereof. As long as combustion conditions exist within the furnace the thermal elements 19 and 20 will be subjected to the heating action of the same and cause relative thermal expansion therebetween. As a result the left-hand end of the rod 20 is caused to assume the position shown which permits the operating beam 35 and actuating arm to be held in position for maintaining the contacts 81—83 and 82—84 closed by the action of the magnet and spring 39.

Assume now that combustion conditions cease to exist, the thermal elements will therefore cool off resulting in a relative contraction of the tube 19 with respect to the rod 20. This causes the left-hand end of rod 20 to move in a left-hand direction and apply its effort to the pivot stud 32 so that calibrating screw 34 is forced outward from the base 6, thereby effecting a swinging movement of the beam 35 in opposition to the tension of biasing spring 39. The beam 35 thus rotates counter-clockwise about its spring hinges 41 and 42, thereby storing a certain amount of tension in the spring hinges. The turned up beam legs 37 and 38 are likewise pivoted so that they effect a bending action upon the spring hinges 51 and 52, with the result that a certain amount of effort is applied to the actuating arm 57 tending to pull or force it in a direction away from the base 5. The armature 91, however, remains under the magnetic influence of the magnet 92 until the effort applied by the actuating arm 57 to the pin 64 is sufficient to overcome the pull of the magnet. When this occurs the actuating arm 57 snaps outward under control of the effort built up in the spring hinges 51 and 52. Shortly after the actuating arm 57 is in its full opening motion the contacts 81—83 and 82—84 are opened because the flexible blade 79 maintains the contacts closed until the actuating arm 57 is in full active motion. This arrangement precludes the possibility of the formation of destructive arcs when the contacts are broken, produces wiping action, assists the spring hinges 51 and 52 in their performance of producing snap action, and because of the pivoted arrangement of the flexible blade 79 and rigid bar 78 upon hinge pin 64, any tendency of the contacts to slightly weld or stick is overcome due to the prying action produced upon them. The pivoting arrangement likewise effects a leveling action of the contacts in their closing position. The bridging of the contacts by the contact arms eliminates the use of flexible connecting wires for the contacts. Since the electrical circuit through the contacts passes through stud 85, contacts 83 and 81, flexible blade 79, contacts 82 and 84 to the stud 86, the opening of either set of contacts will interrupt the electrical circuit passing therethrough. The outward snap action movement of the actuating arm 57 continues under the stresses built up in spring hinges 51—52 until the movable contacts 67—68 carried on the ends of the pivoted bridge arm 65 engage with the contact studs 71—72, respectively, with snap action. The tension stored in spring hinges 51—52 maintains the contacts tightly in engagement with each other and prevents bouncing and chattering. The closure of contacts 67—68 with stationary contacts 71—72, respectively, completes a circuit extending from screw 74, bracket 73, contact stud 71, contact 67, bus-bar 69, contact 68, contact stud 72, bracket 75 and to mounting screw 76.

If the thermal elements 19 and 20, after having cooled off, are again subjected to a rise in temperature conditions the tubular element 19 effects an expansive movement so that the rod 20 permits the beam 35 to be rotated clockwise about the pivoting stud 32 and its spring hinges 41 and 42 by spring 39. This results in building up spring effort in the spring hinges 51 and 52 until a sufficient amount has been built up to move the actuating arm 57 in a direction toward the base 6. When this occurs the actuating arm 57 is quickly moved with snap action which is gradually accelerated as the armature 91 comes within the influence of magnet 92. Contacts 67—71 and 68—72, respectively, break electrically when this occurs, and shortly afterwards contacts 81—83 and 82—84, respectively, close. As soon as the rigid bar 78 strikes the rear of contact 81 the movement of actuating arm 57 is arrested. Since the armature 91 is now completely within the influence of magnet 92 the rigid arm 78 holds the contacts tightly in engagement so they cannot be jarred loose. It should be also noted in the foregoing operations that regardless of how high or low a temperature value the thermal element may be subjected to, the spring hinges 51 and 52 will act as a strain release and thereby prevent any parts of the control from being unduly strained. Also at the same time these spring hinges 51 and 52 permit the contacts to be operated at a definite temperature value in accordance with the scale setting.

From the foregoing it will be seen that the set of spring hinges 51—52 assist the magnet in providing snap action to the opening and closing of either set of contacts in each direction of motion of the actuating arm 57, and it is only necessary to provide a single magnet instead of a separate magnet for each set of contacts. Since the pivoting axis of the operating beam 35 extends from the axis of the rod 20 and the spring hinges 41 and 42 are arranged in a plane slightly below this axis, as is clearly seen in Fig. 5, only a small thermal expansive movement of the thermal elements is necessary to effect a movement of the operating beam 35, this movement being amplified through the arrangement of the legs 37 and 38 at the end of the beam 35.

In order to adjust the temperature point at which the contacts 81—83 and 82—84 are opened and contacts 67—71 and 68—72 are closed, the indicating end 94 of adjusting arm 30 may be grasped and moved either way across the temperature scale stamped upon plate 95. This movement of adjusting arm 30 threads the adjusting stud 29 a greater or less amount upon the end of thermal element 20, thereby increasing or decreasing the temperature value necessary at the thermal element for maintaining the switching mechanism in the normal position illustrated.

So as to properly calibrate the position of the operating beam 35 with respect to the pivoting stud 32 and the thermal elements, the lock nut 36 may be turned away from the beam 35 and the head 33 of calibrating stud 34 turned until the proper adjustment is arrived at. Because of the arrangement of the pivot pin 32 in the recessed head 33 of link member 34 the calibration is maintained intact when the adjusting lever 30 turns the stud 29 on the rod 20.

In order to adjust the operating differential of the control device either of the contact studs 85 or 86 may be turned the proper amount and the gap between the armature 91 and magnet 92 accordingly varied. This adjustment varies the amount of magnetic influence the magnet has upon the armature, and thereby determines the effort necessary to snap the actuating arm 57 away from the influence of the magnet. To properly align the movable contact sets in operative relation to the fixed contact sets, the screws 63 may be loosened and the armature bracket 62 shifted until the contacts are properly aligned after which the screws 63 may be tightened.

It is to be particularly noted that the pivoting pin 64 secured to the end of actuating arm 57 pivotly supports two separate contact carrying arms 65 and 78—79, while the magnetic armature 91 is rigidly secured to the end of actuating arm 57. With this arrangement the position of the armature is never varied thereby, maintaining the operating differential constant. The pivoting arrangement of the contact carrying arms is also such that the leveling effect of each contact set is maintained independent of the effect of the other set of contacts.

The construction and arrangement of the control device elements are such that it is extremely sensitive in operation. The particular rod and tube thermal elements utilized have been found to produce the best results since they respond instantly to temperature conditions. In addition over long periods of operation they do not "creep" or change their characteristics and effect the correct calibration of the device. Since the rod 20 is arranged upon the inside of the tube 19 the accumulation of soot or other materials of the products of combustion upon the tube will not render the thermal elements sluggish in operation. The snap action operation of the contacts insures positive circuit closure and opening and is brought about by the use of the spring hinges 51—52 which assist the magnet in this function and also provide for strain release. The use of spring hinges also eliminates lost motion in the linkage which usually occurs when pin type hinges are utilized. The simple adjustment of the operating differential as well as the positive lever adjusting arrangement on the end of rod 20 for determining the switch operating temperature point, all contribute to the production of the improved and reliable operating control device.

Fig. 6 depicts a circuit diagram illustrating one manner in which the control device may be utilized, for example in a control system for controlling the operation of a stoker. This is merely an illustration of its utility and it will be understood that the device is adaptable for any other control system for heating plants. In the circuit arrangement of Fig. 6 the line voltage conductors for furnishing operating current to the system extend from conductors 101 and 102. A limit control 103 of well known construction for guarding against excessive temperatures is shown connected in series with the line conductor 101. A step-down transformer having its primary winding 104 connected across the line conductors 101 and 102 has its low voltage secondary winding 105 connected to a conventional room thermostat 106 which in turn is connected in parallel with the contacts 107 of an interval timer. The interval timer is of any well known construction comprising essentially a rotatable cam 108 adapted to periodically close timer contacts 107 under the action of synchronous motor 109 which is connected across the line conductors. As is well known the adjustment of cam 108 may be varied in any suitable manner to adjust the time interval in which the contacts 107 are closed. A relay is provided having a winding 110 connected in the low voltage circuit. The relay has a set of contacts 111 which when closed connect the stoker motor 112 directly across the line conductors for operation. Relay winding 110 is connected in series with contacts 83 and 84 of the control device. Where desired a suitable alarm signal which may be a light or bell 113 as shown is connected to contacts 71 and 72 across the secondary transformer winding 105 for operation.

In the normal operation of the stoker operated heating system disclosed, the stoker motor 112 is actuated at predetermined intervals under control of the timer contacts 107 which energizes the relay 110 to close its contacts 111. The circuit for relay 110 is normally completed through the control device contacts 83 and 84. As long as the fire bed in the furnace is maintained alive the thermal elements 19 and 20 will be effective to maintain the actuating arm 57 in position to close the contacts 83 and 84. During the periods that the interval timer may not be operating, the room thermostat may close its contacts 106 in response to a call for heat in the room in which the thermostat is located. The relay 110 is thereby operated in a similar manner as before. Should it occur that the fire become extinguished or be almost extinguished, which may happen in mild weather, the cooling action of the thermal elements causes the actuating arm 57 to snap outward about spring hinges 51 and 52 thereby opening contacts 83—84 and breaking the circuit for relay 110 and preventing its reenergization from either the room thermostat or the interval timer so that the stoker motor 112 is stopped and prevented from feeding additional fuel to the dead fire. The actuating arm 57 closes contacts 71 and 72 in series circuit through bus-bar 69 and energizes the alarm signal 113. The actuation of this alarm signal informs the houseowner that the fire has become extinguished and must be again built up or kindled. The end 94 of the adjusting arm 30 is then manually moved in the left-hand direction as far as it will go, to reset the control device. This action moves the adjusting arm 30 so that the beam 35 is rotated about its spring hinges causing the actuating arm 57 to snap inward to again close contacts 83 and 84 and to open contacts 67—68 to stop the operation of the alarm signal. The room thermostat or the interval timer is thereby rendered effective to take over the operation of the stoker motor 112 when they are in position to close their contacts 106 or 107 and energize relay 110. The fire is then rekindled in the furnace combustion chamber until it is properly built up. After the fire is thoroughly established and the stoker motor operating properly the thermal elements are rendered effective to hold the actuating arm 57 closed against contacts 83—84. The adjusting arm 30 may then be moved in the right-hand direction across the temperature scale to the desired temperature indication, 150° for example, where it is stopped by stop member 97. This is the temperature point at which it has been determined that any decrease in temperature indicates an extinguished fire, and any drop in temperature below 150° therefore acts to operate the control and shut down the stoker. In order that this temperature point may be varied to any position desired the adjustable stop 97 may be shifted along the base 5 and the screw 98 then tightened in slot 99. The adjusting arm 30 thereby is always moved to the same correct stoker operating point.

From the foregoing operations it is seen that whenever the fire in the furnace becomes extinguished, the control operates to disconnect the stoker motor and actuate the signal. The adjusting arm 94 is then moved to the left to stop the signal and restart the stoker motor by holding the motor contacts closed independent of the thermal elements. After the fire is rekindled and the temperature raised to 150°, the thermal element again functions to hold the contacts closed. The arm 94 may then be moved to the right again until it encounters the stop 97. The control is thereby reset for operation.

Under certain circumstances the thermal elements may be subjected to elevated temperature conditions and in this event the pivot pin 32 may be moved by the rod 20 to such an extent that it may leave its resting place in the screw head 33. This will occur when the biasing spring 39 is exactly balanced against the resultant tension stored in spring hinges 41—42 and 51—52. Since the head of screw 33 is cone shaped, the pivot pin 32 is easily aligned in position when the temperature surrounding the thermal element drops again.

While in Fig. 6 there has been disclosed a system illustrating the use of the control device as connected in the low voltage secondary circuit, it will be appreciated that the connecting terminals 13 for contacts 71—72 could readily be connected directly across the line voltage conductors 101 and 102 and in series with the signal 113 for operating the same. Likewise the terminals 12 for contacts 83—84 could be connected directly in series with the motor 112.

While only a preferred embodiment of the control device has been illustrated and described, it will be apparent to those skilled in the art that many variations from the exact construction may be made without departing from the scope of the invention. It is, therefore, desired that the invention be not limited to the exact disclosure but only to the extent of the appended claims.

What is claimed is:

1. In a control device of the class described, a base, physical condition responsive means on the base, an operating beam operatively associated with the condition responsive means, a first means for hinging the operating beam to the base, an actuating arm, a second means for hinging the actuating arm to the operating beam for movement thereby in two directions, cooperative control means on the base and on the actuating arm, means for imparting snap action to the operation of the control means in each direction of movement of the actuating arm, said snap action means including said second hinging means, and means for adjusting the response of the operating beam to the physical condition responsive means.

2. In a control device of the class described, a base, temperature responsive means on the base, an operating beam operatively associated with the temperature responsive means, an actuating arm movable by said operating beam in two directions, cooperative control means on the base and the actuating arm operated by the actuating arm, means for imparting snap action to the operation of the control means in both directions of movement of the actuating arm, and spring hinge means connecting the actuating arm to the operating beam, said spring hinge means assisting the snap action means in producing snap action and providing strain release for the temperature responsive means.

3. In a control device of the class described, a base, temperature responsive means on the base, an operating beam operatively associated with the temperature responsive means, a first spring hinge means for pivoting said operating beam on the base, an actuating arm, a second spring hinge means connecting the actuating arm with the operating beam whereby the actuating arm is moved in two directions by operation of the operating beam, means for adjusting the point at which said temperature responsive means operates the operating beam, means for biasing the operating beam against the temperature responsive means, cooperative control means operated by the movement of the actuating arm, and means including said second spring hinge means for imparting snap action to the operation of the control means.

4. In a control device of the class described, a base, an operating beam, a first spring hinge pivotally supporting one end of the operating beam from the base, a thermal element supported on the base, an adjustable associating link operatively connecting the operating beam with the thermal element, means on the other end of the operating beam for biasing the operating beam against the thermal element, an actuating arm, a second spring hinge pivotally supporting one end of the actuating arm from the pivoted end of the operating beam whereby the actuation of the operating beam by the thermal element is effective to first stress said second spring hinge and then to move said actuating arm in either of two directions, means including said second spring hinge for imparting snap action to the movement of the actuating arm, said second spring hinge also providing strain release for the thermal element, and control means operated by the movement of the actuating arm.

5. In a control device of the class described, a base, a thermal element supported on the base, an operating beam having a pair of supporting legs on one end thereof, a first spring hinge connection for each supporting leg for pivoting the operating beam to the base, an adjustable calibrating member associating the pivoted end of the operating beam with the thermal element for imparting the movement of the thermal element to the operating beam, means for biasing the operating beam against the thermal element, an actuating arm having a pair of supporting legs on one end thereof, a second spring hinge connection for each supporting leg for pivoting the actuating arm to the supporting legs of the operating beam, the movement of the operating beam by the thermal element being effective to rotate the operating beam about said first spring hinges to stress said second spring hinges whereby said actuating arm is shifted in either one of two directions, cooperative snap acting means on the other end of the actuating arm and on the base for imparting snap action to the movement of the actuating arm, the stresses built up in said second spring hinges assisting in the snap action movement and providing strain release for the thermal element, and cooperative control means on the actuating arm and the base operated by the movement of the actuating arm.

6. In a control device, a supporting base, a thermal element mounted on the supporting base, an operating beam arranged parallel to the base and having leg portions projecting therefrom, a pair of hinges connecting respective beam leg portions with the base for pivoting the beam for movement with respect to the base, an adjustable connecting link extending between the thermal element and the operating beam at a point adjacent its pivoted end, said connecting link arranged between said projecting beam legs and engaging said beam at a point slightly above a line extending between said hinges so that the movement of the operating beam by the thermal element is amplified at the end of the operating beam, means on the other end of the beam for biasing the beam in a direction tending to hold the connecting link in contact with the thermal element, an actuating arm, spring hinge means connecting one end of the actuating arm with the beam leg portions for pivoting the actuating arm to the beam, a pair of control arms pivoted to the actuating arm, movable control elements carried by the end of each of said control arms, fixed control elements supported on the base in operative relation to the movable control elements, means for imparting snap action to the engagement and disengagement of the control elements, said snap action assisted by said spring hinges, and means for adjusting the temperature point at which said thermal element is effective to actuate the control elements.

7. In a control device, a supporting base, an operating beam, a first spring hinge means for pivoting the operating beam to the base, a temperature responsive element supported on the base and operatively associated with one end of the operating beam for moving the same about its spring hinge means, an actuating arm, a second spring hinge means connecting the actuating arm with the pivoted end of the operating beam whereby the actuating arm is moved in either of two directions by the operating beam, a pair of contact arms each independently pivoted between their ends to the actuating arm, a contact point carried on each end of each contact arm, fixed control contacts arranged on the base in operative relation to each of the contacts on the contact arms, means for imparting snap action to the opening and closing of the contacts in each direction of movement of the actuating arm, and means for regulating the temperature point at which the contacts are actuated.

8. In a control device, a supporting base, an actuating arm, operating means for the actuating arm on the base, means for pivoting said actuating arm to the operating means and to the base whereby the actuating arm is moved in either of two directions, a bracket actuated by the actuating arm, a pair of contact arms, means for independently pivoting each of the contact arms to the bracket, magnetic armature means carried by the bracket, contact points supported on both contact arms, fixed contact points supported on the base in operative relation to the contact points on the contact arms, said actuating arm effective to move said contact arms to close one set of contact points and open the other set of contact points, and magnet means cooperating with the armature means for imparting snap action to movement of said contact points.

9. In a control device, a base, an actuating arm, operating means for the arm supported from the base, spring hinge means pivotally supporting one end of the actuating arm from the base and from the operating means, the other end of said actuating arm being movable, a bracket supported from the movable end of the actuating arm, a pair of contact arms each independently pivoted intermediate its ends to the actuating arm bracket, a pair of contact points secured to the ends of one of the contact arms and another pair of contact points secured to the ends of the other contact arm, corresponding pairs of fixed contact points supported upon the base in operative relation to the pairs of contact points on the contact arms, said actuating arm effective to open and close the various pairs of contact points in each direction of movement of the actuating arm, and cooperative means on the bracket and the base for imparting snap action to the opening and closing of the contact points.

10. In a control device, an actuating arm, means for actuating the same in two directions of movement, a bracket supported on the movable end of the actuating arm, a hinge pin supported on the bracket, a pair of bridging contact arms supported intermediate their ends independent of one another for pivotal movement on the hinge pin, one of said contact arms arranged on one side of the hinge pin and the other contact arm on the other side of the hinge pin, a movable contact point carried on each end of each contact arm, fixed contact points arranged in operative relation with the movable contact points, the contacts on each of the contact arms arranged to bridge a pair of fixed contacts when closed, said actuating arm effective in either of its directions of movement to disengage certain contacts and to engage other contacts, magnetic armature means on said actuating arm bracket, and permanent magnet means arranged in operative relation to the armature means whereby snap action is provided for the opening and closing of said contacts.

11. In a control device, an actuating arm, means for moving one end of the actuating arm in either of two directions, a pivoting pin carried by said actuating arm, a pair of contact arms pivoted between their ends to the pivot pin, said contact arms arranged for pivotal movement from the end of the actuating arm and in a direction of movement with the actuating arm, said contact arms arranged on opposite sides of said pivot pin, a separate contact point supported from each end of each contact arm, a fixed contact point for each contact on the contact arms supported in operative relation thereto, the contacts of each contact arm arranged to bridge a pair of the associated fixed contacts, the movement of said actuating arm effective to open and close the contact points associated with each contact arm in either direction of movement, and means for imparting snap action to the opening and closing of the contacts.

12. In a control device, a thermal element comprising an elongated relatively expansible outer member and a relatively non-expansible inner member associated therewith, an adjusting stud threadedly engaging the end of the inner member and having a pivot member at the end thereof, a calibrating link member having a recessed head engaging the pivot member of the adjusting stud, said adjusting stud, said pivot member, and said link member all arranged in axial alignment with the inner member, an operating control member threaded upon the link member, the position of the control member upon the link member being adjusted by turning the head of the link member whereby the operation of the control member is calibrated with respect to the thermal element, and an adjusting lever connected to the adjusting stud for adjusting the temperature point at which the thermal element actuates the control member.

13. In a control device, a thermal element comprising an elongated relatively expansible outer member and a relatively non-expansible inner member associated therewith, an adjusting stud threadedly engaging the end of the inner member and having a pivot at the end thereof, a calibrating link member having a recessed head engaging the pivot member of the adjusting stud, said adjusting stud, said pivot member, and said link member all arranged in axial alignment with the inner member, an operating control member threaded upon the link member, the position of the control member upon the link member being adjusted by turning the link member whereby the operation of the control member is calibrated with respect to the thermal element, and an adjusting lever connected to the adjusting stud for adjusting the temperature point at which the thermal element actuates the control member, the movement of the adjusting lever rotating the pivot member in the recessed link member head without affecting the calibration of the control member.

14. In a control device, a mounting base, a thermal element comprising an expansible outer member supported at one end from the base and a relatively non-expansible inner member associated therewith, means for rigidly connecting said outer and inner members together at their ends remote from the base, adjusting means engaging the other end of the inner member, a link member pivotly engaging said adjusting means, said adjusting means and said link member arranged in axial alignment with the inner member, control operating means connected to the link member and pivoted to the base, means for varying the position of the control operating means on the link member to calibrate the device, and means for varying the position of the adjusting means on the inner member to adjust the temperature point at which the control operating means is operated by the thermal element.

15. In a control device, a thermal element comprising elongated outer and inner members having different coefficients of expansion and connected together at one of their ends, an adjusting stud threaded upon the other end of the inner member, said adjusting stud carrying a pivot, a connecting link member having a recessed head engaging the pivot, an operating beam mounted upon the link member, means for locking the operating beam at any position on the link member to calibrate the operating beam with the thermal element, said adjusting stud, said pivot and said link member all arranged in axial alignment with the inner member, means for pivoting the operating beam for movement by the thermal element and for biasing the operating beam to hold the recessed head of the link member firmly against said pivot, an actuating arm pivoted to the operating beam for movement thereby, control means operated by movement of the actuating arm, and an adjusting lever secured to the adjusting stud for adjusting the same upon the inner member to alter the position of the operating beam and thereby move the actuating arm to operate the control means at a predetermined temperature point.

16. In a control device, a supporting base, a thermal element comprising an elongated rod and tube having relatively different coefficients of expansion, said rod extending axially inside the tube, means for securing the rod and tube together at one of their ends including a plug for closing the end of the tube, a supporting collar fastened to the base and having an opening therein through which the rod extends, means around the collar opening for securing the other end of the tube to the collar, control means pivoted to the base, adjusting and calibrating means extending axially from the free end of the rod and connecting with the control means whereby the same is operated responsive to the thermal actuation of the rod and tube, and a tubular protective member surrounding a portion of the thermal element and secured at one end to the supporting collar.

17. In a control device of the class described, a base, temperature responsive means supported axially from the base, normally closed control means on the base arranged to be opened by the temperature responsive means upon a fall in temperature, an adjusting arm for adjusting the temperature point at which the control means is opened, said adjusting arm connected to the supported end of the temperature responsive means and arranged for axial movement thereabout, said adjusting arm effective in one direction to reclose said control means independent of the temperature responsive means and in the other direction to reset the control means under control of the temperature responsive means.

18. In a control device of the class described, a base, temperature responsive means supported axially from the base, control means on the base arranged to be actuated by the temperature responsive means upon a fall in temperature, an adjusting arm for adjusting the temperature point at which the control means is actuated, said adjusting arm arranged for movement axially from the base end of the temperature responsive means, the movement of the adjusting arm in one direction resetting the control means after having been actuated by the temperature responsive means, the movement of the adjusting arm in the other direction again placing said control means under control of the temperature responsive means.

19. In a control device for a burner apparatus wherein combustion conditions are produced, a base, combustion responsive means supported upon the base, normally closed control means connected to said combustion responsive means and arranged to be opened thereby in response to the cessation of combustion conditions for stopping the operation of the burner apparatus, an adjusting arm on the base connected to the combustion responsive means and adjustable over a particular temperature range, an adjustable stop on the base for limiting the maximum temperature setting, said maximum temperature setting determining the temperature value at which the combustion responsive means effects the opening of the control means upon the cessation of combustion, said adjusting arm movable in a direction away from the adjustable stop to reclose said control means independent of the combustion responsive means whereby combustion is reestablished by the reoperation of the burner apparatus, said adjustable arm subsequently movable against the adjustable stop to reset the control device.

20. In a device of the class described, an operating beam, a control arm, a first spring hinge supporting the operating beam, means for actuating the operating beam about said spring hinge, a second spring hinge operatively supporting the control arm upon the operating beam, switch means controlled by the control arm, said switch means operated with snap action, at least one of said spring hinges assisting in the snap action of the switch means and providing a strain release for the movement of the operating beam.

21. In a control device for a fuel burning apparatus wherein combustion conditions are produced, a base, combustion responsive means supported upon the base and in position to be influenced by combustion conditions as a result of the operation of the fuel burning apparatus, a burner control switch actuated by the combustion responsive means, said control switch maintained closed as long as combustion conditions continue to exist and opened upon cessation of combustion conditions to stop the operation of the fuel burning apparatus, an adjusting arm on the base associated with the combustion responsive means and arranged to adjust the combustion responsive means to open the control switch at a predetermined maximum temperature value, the setting of said adjusting arm also indicating the temperature point below which combustion conditions cease to exist, an adjustable stop on the base engaged by the adjusting arm for limiting the movement of the adjusting arm to said predetermined maximum temperature value, said adjusting arm arranged to be manually moved away from said stop and effective to reclose the control switch independent of the combustion responsive means when combustion has ceased, the reclosing of the control switch reestablishing the operation of the fuel burning apparatus to again promote combustion conditions so that the combustion responsive switch is enabled to function to maintain the control switch closed independent of the adjusting arm, said adjusting arm subsequently movable against said stop to reset the device for automatic operation by the combustion responsive means.

22. In a control device of the class described, a base, an operating member, physical condition responsive means associated with said base and with said operating member for moving said operating member relative to the base, an actuating arm, means including resilient hinge means for attaching said actuating arm to said operating member for causing movement of said actuating arm with said operating member but permitting relative motion between the same, control means actuated upon movement of said actuating arm, snap action means for imparting snap action to the operation of said control means, said snap action means including said hinge means.

23. In a control device, a supporting base, an actuating arm pivoted to the base, operating means for oscillating said actuating arm between a first position and a second position, a first contact arm, means including pivot means associated with an intermediate portion of said first contact arm for pivotally attaching said first contact arm to said actuating arm, said first contact arm having a pair of contact portions associated therewith and located on opposite sides of said pivot means, said contact portions both facing the first position of said actuating arm, a pair of relatively stationary contacts adapted for engagement with said contact portions when the actuating arm is in its first position, a second contact arm, means including pivot means associated with an intermediate portion of said second contact arm for pivotally attaching said second contact arm to said actuating arm, said second contact arm having a pair of contact portions associated therewith and located on opposite sides of the pivot means thereof, said last mentioned contact portions both facing the second position of said actuating arm, a second pair of relatively stationary contacts adapted for engagement with said last mentioned contact portions when the actuating arm is in its second position, said operating means including means for causing movement of the actuating arm to and from both of its positions with snap action.

24. In a control device, a supporting base, an actuating arm, operating means for oscillating said actuating arm between a first position and a second position, a movable contact bracket attached to said actuating arm, contact arm means, including pivot means associated with said contact arm means intermediate its ends for pivotally attaching said contact arm means to said movable contact bracket, a pair of contact portions associated with said contact arm means and located on opposite sides of said pivot means, a pair of contact studs electrically insulated from each other and supported by said base on one side of said contact arm means, said contact studs having contact surfaces adapted to be engaged by said contact portions when the actuating arm is in its first position and acting as stops for limiting travel of said contact arm means in one direction, stationary bracket means secured to said base and extending adjacent said contact arm means on the side thereof opposite said contact studs, a contact supported by said stationary bracket means, a contact portion associated with said contact arm means on one side of said pivot means and adapted to engage said contact when the actuating arm is in its second position, means carried by said stationary bracket means and adapted to engage the contact arm means on the opposite side of said pivot means from said contact when the actuating arm is in its second position, and means for causing movement of said actuating arm with snap action between its positions.

25. In a control device, a supporting base, thermal responsive means comprising elongated first and second members having different coefficients of thermal expansion, said members extending outwardly from said supporting base, the inner end of said first member being attached to said supporting base and the outer end of said first member being attached to the outer end of said second member whereby the inner end of said second member moves relatively to the base upon change in temperature of said thermal responsive means, an operating beam, hinge means for securing said operating beam to said supporting base, an actuating member having a limited range of movement and actuated by movement of said operating beam, switching mechanism actuated by said actuating member, means including adjusting means carried by the inner end of said second member and engaging said operating beam adjacent its hinge means whereby said operating beam is rotated about its hinge means upon change in temperature of the thermal responsive means, and strain release means interposed between said adjusting means and said actuating member for permitting continued movement of said thermal responsive means after said actuating member reaches its limit of movement.

HUGH KELLY.